US006928102B2

(12) United States Patent
Zeira et al.

(10) Patent No.: US 6,928,102 B2
(45) Date of Patent: *Aug. 9, 2005

(54) USER EQUIPMENT USING COMBINED CLOSED LOOP/OPEN LOOP POWER CONTROL

(75) Inventors: Ariela Zeira, Huntington, NY (US); Fatih M. Ozluturk, Port Washington, NY (US); Sung-Hyuk Shin, Northvale, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/831,902

(22) Filed: Apr. 26, 2004

(65) Prior Publication Data

US 2004/0196890 A1 Oct. 7, 2004

Related U.S. Application Data

(63) Continuation of application No. 10/459,035, filed on Jun. 11, 2003, now Pat. No. 6,728,292, which is a continuation of application No. 09/531,359, filed on Mar. 21, 2000, now Pat. No. 6,600,772.

(51) Int. Cl.[7] .............................................. H04B 1/69
(52) U.S. Cl. ...................... 375/130; 375/295; 455/522; 370/342
(58) Field of Search ................................ 375/130, 295, 375/146; 370/335, 342, 252; 455/69, 522

(56) References Cited

U.S. PATENT DOCUMENTS

| 4,868,795 A | 9/1989 | McDavid et al. |
| 5,056,109 A | 10/1991 | Gilhousen et al. |
| 5,542,111 A | 7/1996 | Ivanov et al. |
| 5,839,056 A | 11/1998 | Hakkinen |
| 5,859,838 A | 1/1999 | Soliman |
| 6,101,179 A | 8/2000 | Soliman |
| 6,108,561 A * | 8/2000 | Mallinckrodt ................ 455/522 |
| 6,175,586 B1 | 1/2001 | Lomp |
| 6,175,745 B1 * | 1/2001 | Bringby et al. .............. 455/522 |
| 6,188,678 B1 | 2/2001 | Presott |
| 6,373,823 B1 | 4/2002 | Chen et al. |
| 6,449,462 B1 | 9/2002 | Gunnerson et al. |
| 6,600,772 B1 | 7/2003 | Zeira et al. |
| 6,728,292 B2 * | 4/2004 | Zeira et al. .................. 375/130 |
| 2002/0080764 A1 | 6/2002 | Zeira et al. |

FOREIGN PATENT DOCUMENTS

| EP | 0462952 | 12/1991 |
| EP | 0610030 | 8/1994 |
| EP | 0682419 | 11/1995 |
| EP | 0500689 | 4/1998 |
| WO | 9749197 | 12/1997 |
| WO | 97/49197 | 12/1997 |
| WO | 08/45962 | 10/1998 |
| WO | 9845962 | 10/1998 |

OTHER PUBLICATIONS

"Specification of Air–Interface for the 3G Mobile System", Version 1.0, ARIB, Jan. 14, 1999.

(Continued)

Primary Examiner—Temesghen Ghebretinsae
(74) Attorney, Agent, or Firm—Volpe and Koenig, P.C.

(57) ABSTRACT

A spread spectrum time division duplex user equipment uses frames with time slots for communication. It receives power commands and receives a first communication having a transmission power level in a first time slot. It measures a power level of the first communication as received and determines a pathloss estimate based on in part the measured received first communication power level and the first communication transmission power level. The user equipment sets a transmission power level for a second communication in a second time slot from the user equipment based on in part the pathloss estimate weighted by a quality factor and adjusted by the power commands.

7 Claims, 7 Drawing Sheets

OTHER PUBLICATIONS

Zeira et al., "Combined Closed–Loop/Open–Loop Power Control Process for Time Division Duplexing", Apr. 1999.

Zeira et al., "Performance of Weighted Open Loop Scheme for Uplink Power Control in TDD Mode", May 1999.

Zeira et al., "Text Proposal for S1.24", May 1999.

"Specification of Air–Interface for the 3G Mobile System", Version 1.0, ARIB, Jan. 14, 1999.

"Combined Closed–Loop/Open–Loop Power Control Process for Time Division Duplexing", Ariela Zeira, Sung–Hyuk Shin and Fatih Ozluturk, Apr. 1999.

"Performance of Weighted Open Loop Scheme for Uplink Power Control in TDD Mode", Ariela Zeira and Sung–Hyuk Shin, May 1999.

"Text Proposal for S1.24", Ariela Zeira, Sung–Hyuk Shin and Stephen Dick, May 1999.

* cited by examiner

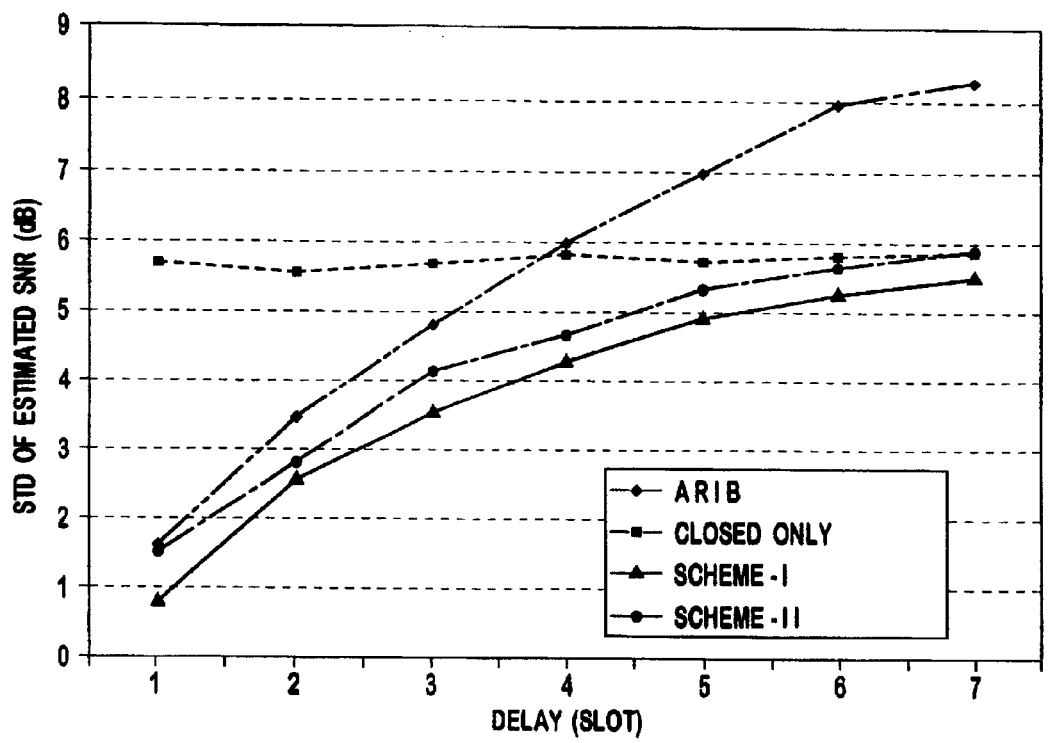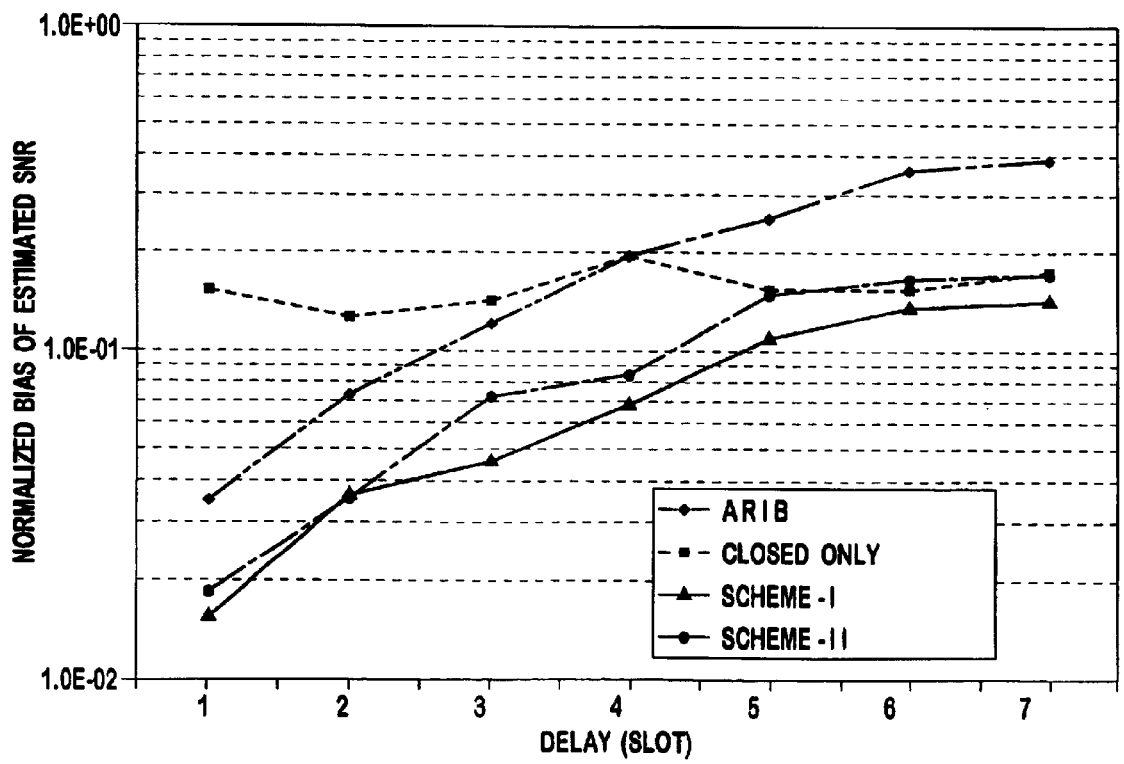

USER EQUIPMENT USING COMBINED CLOSED LOOP/OPEN LOOP POWER CONTROL

CROSS REFERENCE TO RELATED APPLICATION

This application is a continuation of U.S. application Ser. No. 10/459,035, filed Jun. 11, 2003 now U.S. Pat. No. 6,728,292, which is a continuation of U.S. patent application Ser. No. 09/531,359 filed Mar. 21, 2000 now U.S. Pat. No. 6,600,772, which is incorporated by reference as if fully set forth.

BACKGROUND

This invention generally relates to spread spectrum time division duplex (TDD) communication systems. More particularly, the present invention relates to a system and method for controlling transmission power within TDD communication systems.

FIG. 1 depicts a wireless spread spectrum time division duplex (TDD) communication system. The system has a plurality of base stations 301–307. Each base station 301 communicates with user equipments (UEs) 321–323 in its operating area. Communications transmitted from a base station 301 to a UE 321 are referred to as downlink communications and communications transmitted from a UE 321 to a base station 301 are referred to as uplink communications.

In addition to communicating over different frequency spectrums, spread spectrum TDD systems carry multiple communications over the same spectrum. The multiple signals are distinguished by their respective chip code sequences (codes). Also, to more efficiently use the spread spectrum, TDD systems as illustrated in FIG. 2 use repeating frames 34 divided into a number of time slots 361–36n, such as fifteen time slots. In such systems, a communication is sent in selected time slots 361–36n using selected codes. Accordingly, one frame 34 is capable of carrying multiple communications distinguished by both time slot 361–36n and code. The combination of a single code in a single time slot is referred to as a resource unit. Based on the bandwidth required to support a communication, one or multiple resource units are assigned to that communication.

Most TDD systems adaptively control transmission power levels. In a TDD system, many communications may share the same time slot and spectrum. When a UE 321 or base station 301 is receiving a specific communication, all the other communications using the same time slot and spectrum cause interference to the specific communication. Increasing the transmission power level of one communication degrades the signal quality of all other communications within that time slot and spectrum. However, reducing the transmission power level too far results in undesirable signal to noise ratios (SNRs) and bit error rates (BERs) at the receivers. To maintain both the signal quality of communications and low transmission power levels, transmission power control is used.

One approach to control transmission power levels is open loop power control. In open loop power control, typically a base station 301 transmits to a UE 321 a reference downlink communication and the transmission power level of that communication. The UE 321 receives the reference communication and measures its received power level. By subtracting the received power level from the transmission power level, a pathloss for the reference communication is determined. To determine a transmission power level for the uplink, the downlink pathloss is added to a desired received power level at the base station 301. The UE's transmission power level is set to the determined uplink transmission power level.

Another approach to control transmission power level is closed loop power control. In closed loop power control, typically the base station 301 determines the signal to interference ratio (SIR) of a communication received from the UE 321. The determined SIR is compared to a target SIR (SIRTARGET). Based on the comparison, the base station 301 transmits a power command, bTPC. After receiving the power command, the UE 321 increases or decreases its transmission power level based on the received power command.

Both closed loop and open loop power control have disadvantages. Under certain conditions, the performance of closed loop systems degrades. For instance, if communications sent between a UE and a base station are in a highly dynamic environment, such as due to the UE moving, such systems may not be able to adapt fast enough to compensate for the changes. The update rate of closed loop power control in TDD is 100 cycles per second which is not sufficient for fast fading channels. Open loop power control is sensitive to uncertainties in the uplink and downlink gain chains and interference levels.

One approach to combining closed loop and open loop power control was proposed by the Association of Radio Industries and Business (ARIB) and uses Equations 1, 2, and 3.

$$T_{UE} = P_{BS}(n) + L \qquad \text{Equation 1}$$

$$P_{BS}(n) = P_{BS}(n-1) + b_{TPC}\Delta_{TPC} \qquad \text{Equation 2}$$

$$b_{TPC} = \begin{cases} 1: & \text{if } SIR_{BS} < SIR_{TARGET} \\ -1: & \text{if } SIR_{BS} > SIR_{TARGET} \end{cases} \qquad \text{Equation 3}$$

$T_{UE}$ is the determined transmission power level of the UE $32_1$. $L$ is the estimated downlink pathloss. $P_{BS}(n)$ is the desired received power level of the base station $30_1$ as adjusted by Equation 2. For each received power command, bTPC, the desired received power level is increased or decreased by $\Delta_{TPC}$. $\Delta_{TPC}$ is typically one decibel (dB). The power command, $b_{TPC}$, is one, when the SIR of the UE's uplink communication as measured at the base station 30, $SIR_{BS}$, is less than a target SIR, $SIR_{TARGET}$. Conversely, the power command is minus one, when $SIR_{BS}$ is larger than $SIR_{TARGET}$.

Under certain conditions, the performance of these systems degrades. For instance, if communications sent between a UE 32 and a base station 30 are in a highly dynamic environment, such as due to the UE 32 moving, the path loss estimate for open loop severely degrades the overall system's performance. Accordingly, there is a need for alternate approaches to maintain signal quality and low transmission power levels for all environments and scenarios.

SUMMARY

A spread spectrum time division duplex user equipment uses frames with time slots for communication. It receives power commands and receives a first communication having a transmission power level in a first time slot. It measures a power level of the first communication as received and determines a pathloss estimate based on in part the measured received first communication power level and the first communication transmission power level. The user equipment sets a transmission power level for a second communication in a second time slot from the user equipment based on in part the pathloss estimate weighted by a quality factor and adjusted by the power commands.

BRIEF DESCRIPTION OF THE DRAWINGS

FIGS. 5–10 depict graphs of the performance of a closed loop, ARIB's proposal and two (2) schemes of combined closed loop/open loop power control.

DETAILED DESCRIPTION OF THE PREFERRED EMBODIMENTS

Figure 1:
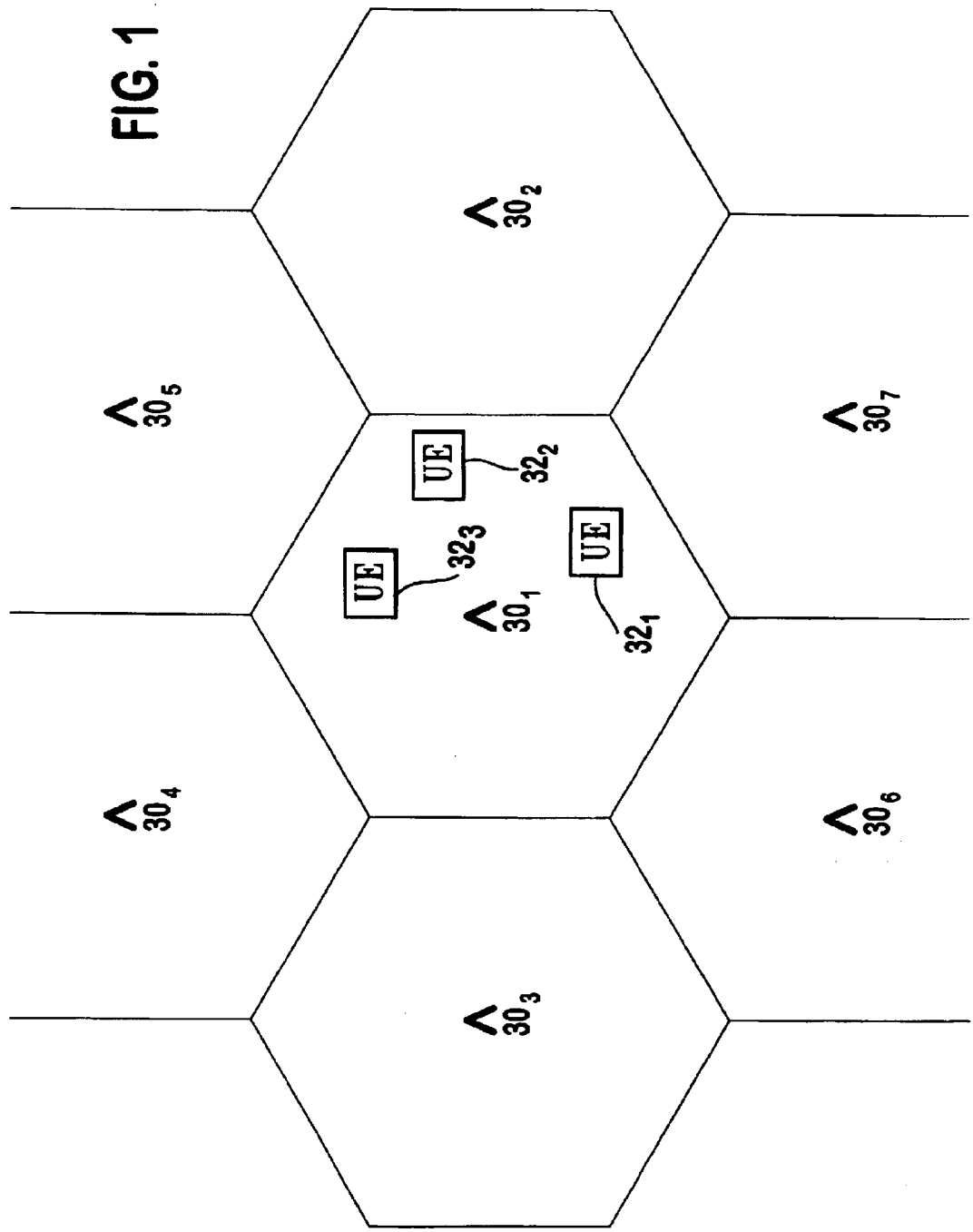
FIG. 1 illustrates a prior art TDD system.
Figure 2:
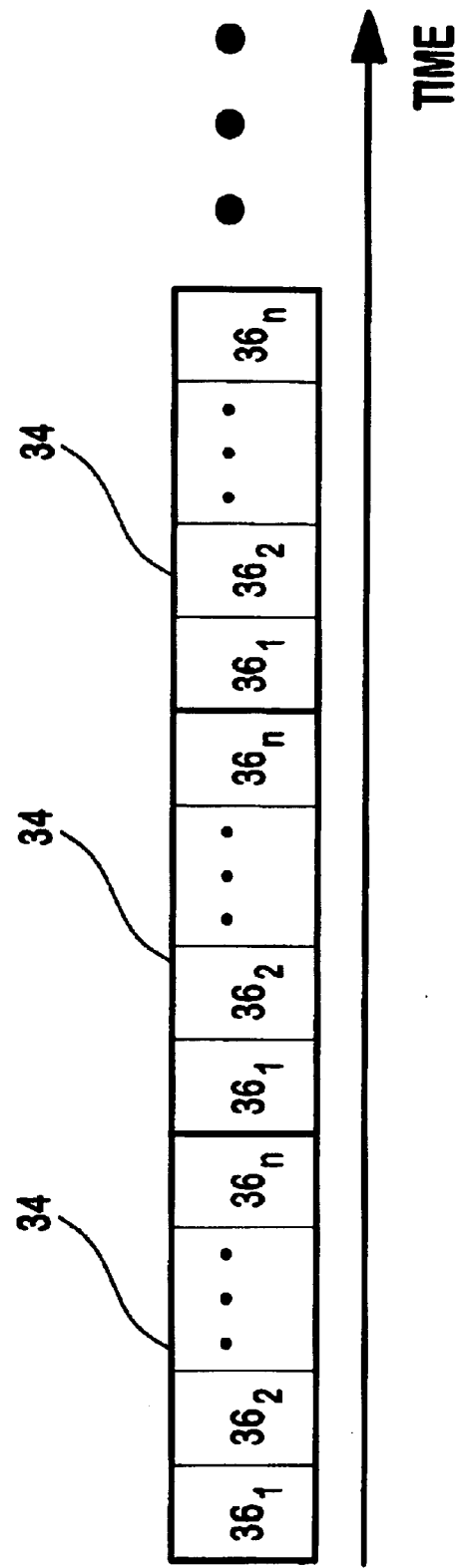
FIG. 2 illustrates time slots in repeating frames of a TDD system.
Figure 3:
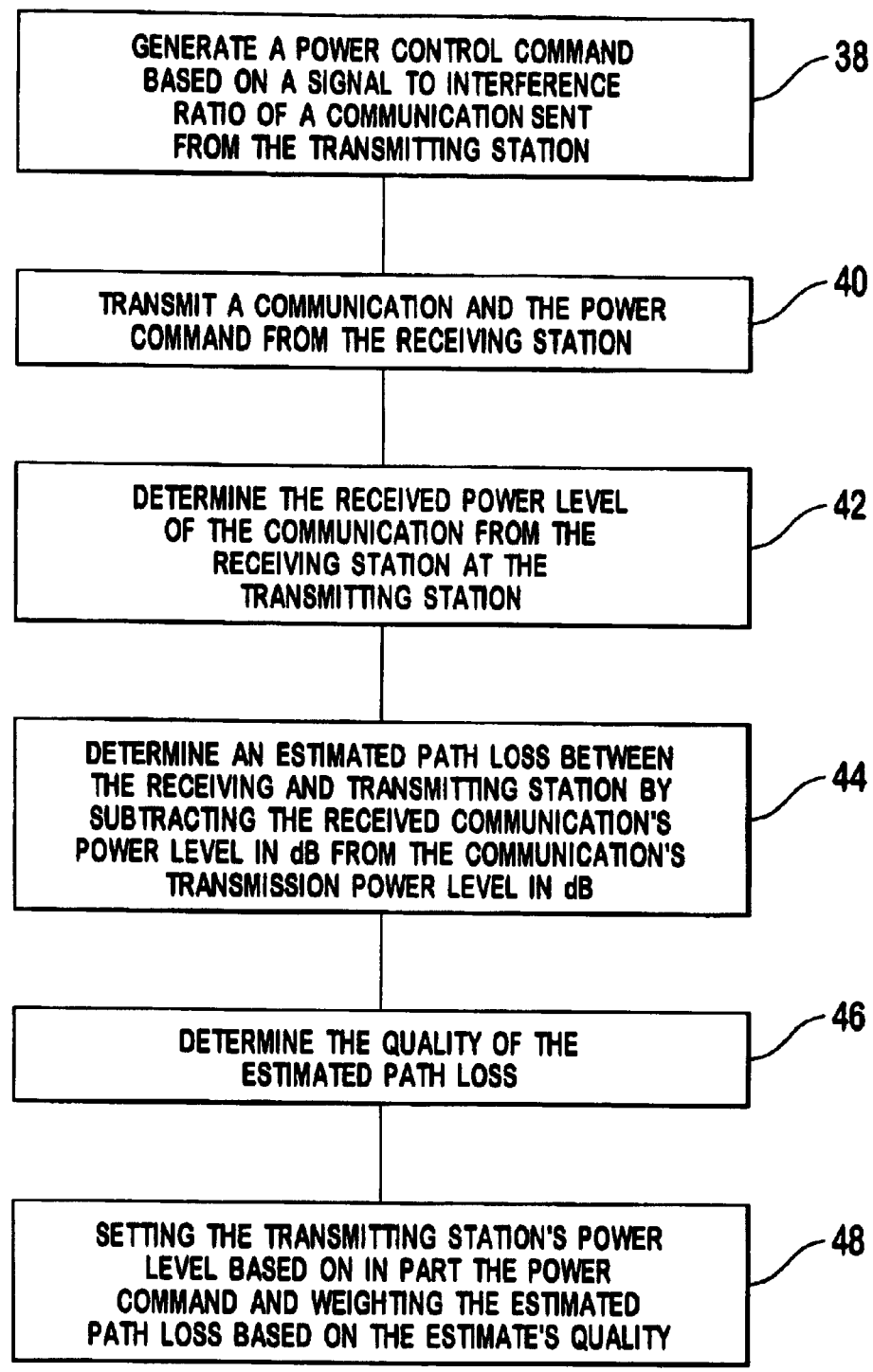
FIG. 3 is a flow chart of combined closed loop/open loop power control.
Figure 4:
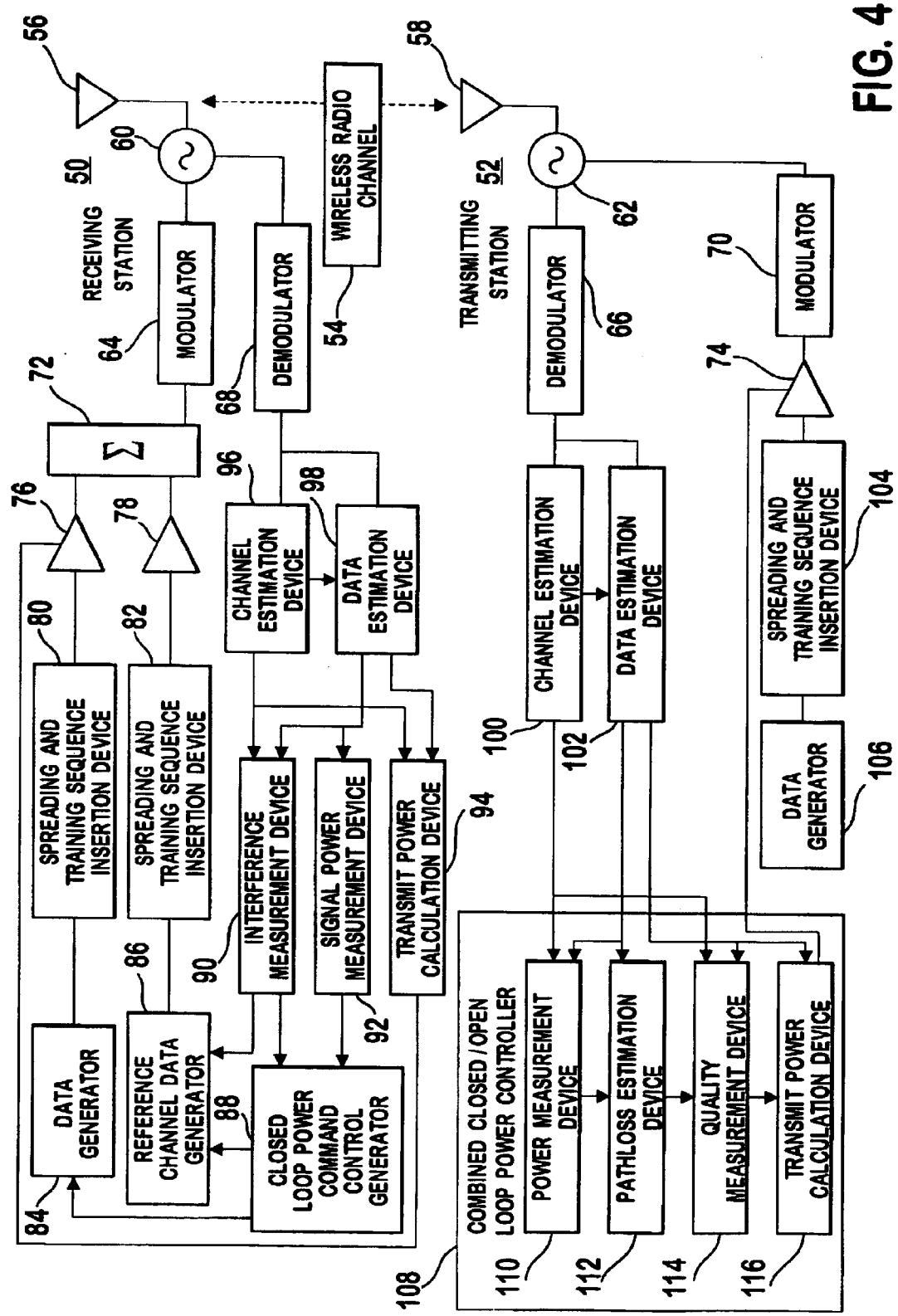
FIG. 4 is a diagram of components of two communication stations using combined closed loop/open loop power control.
Figure 5:
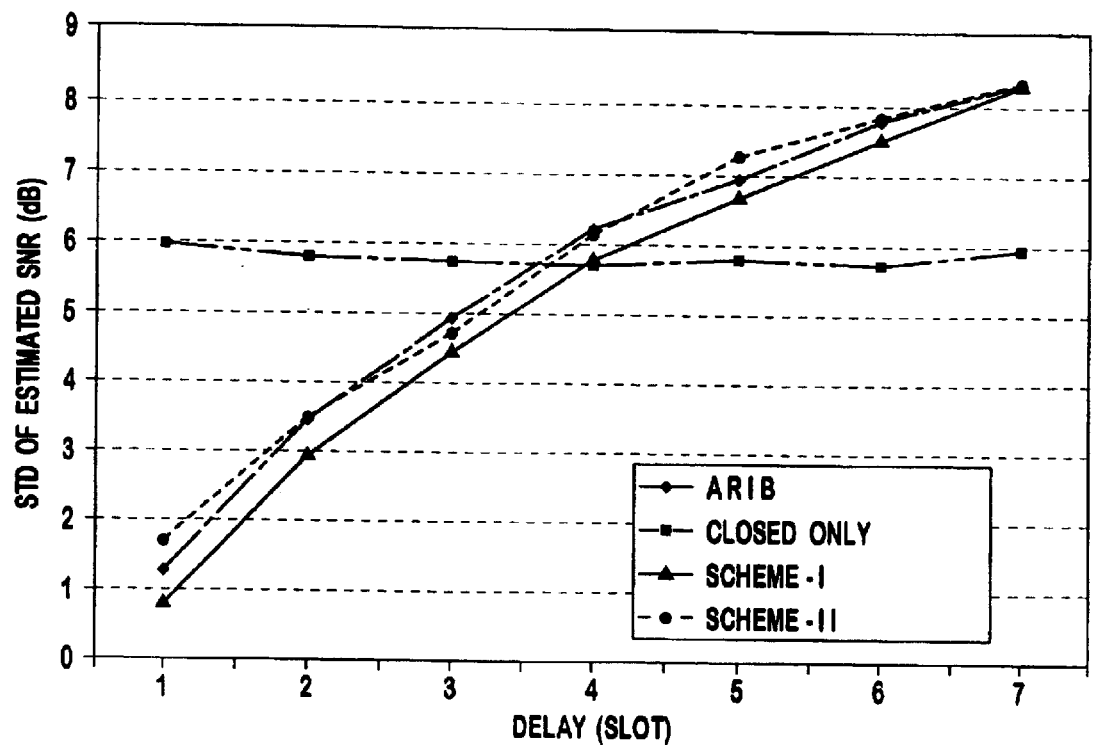
Figure 6:
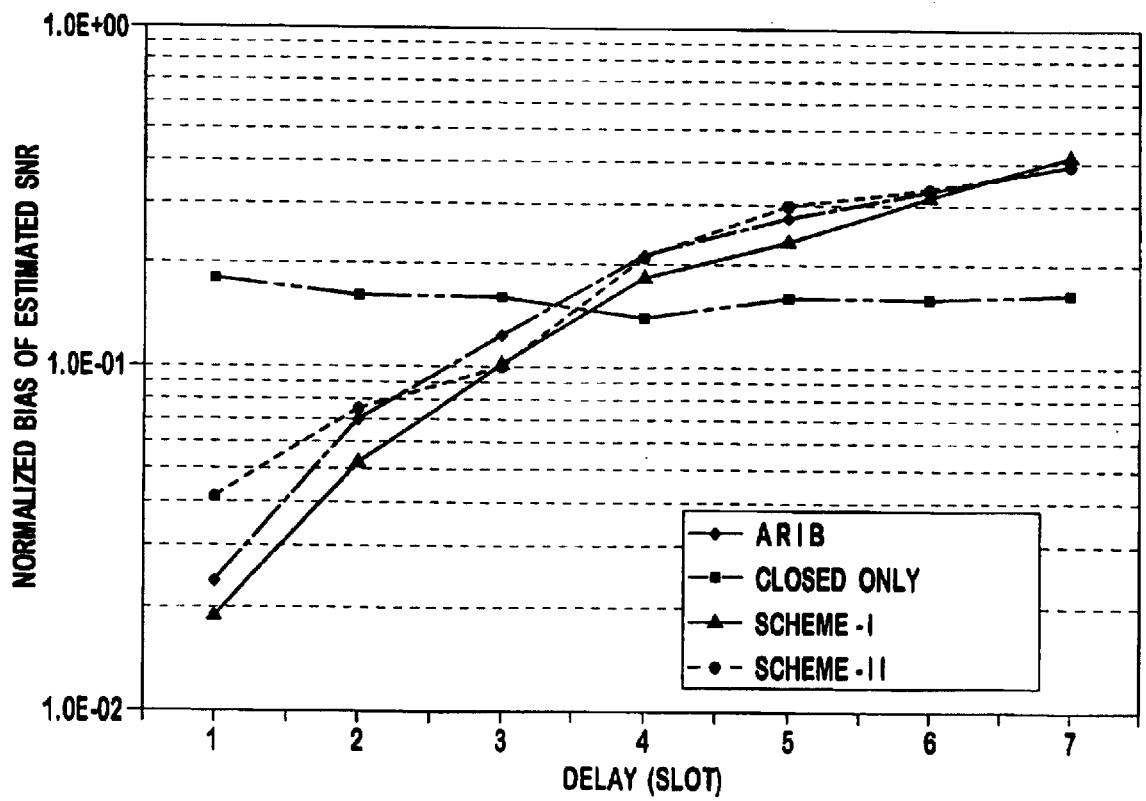
Figure 7:
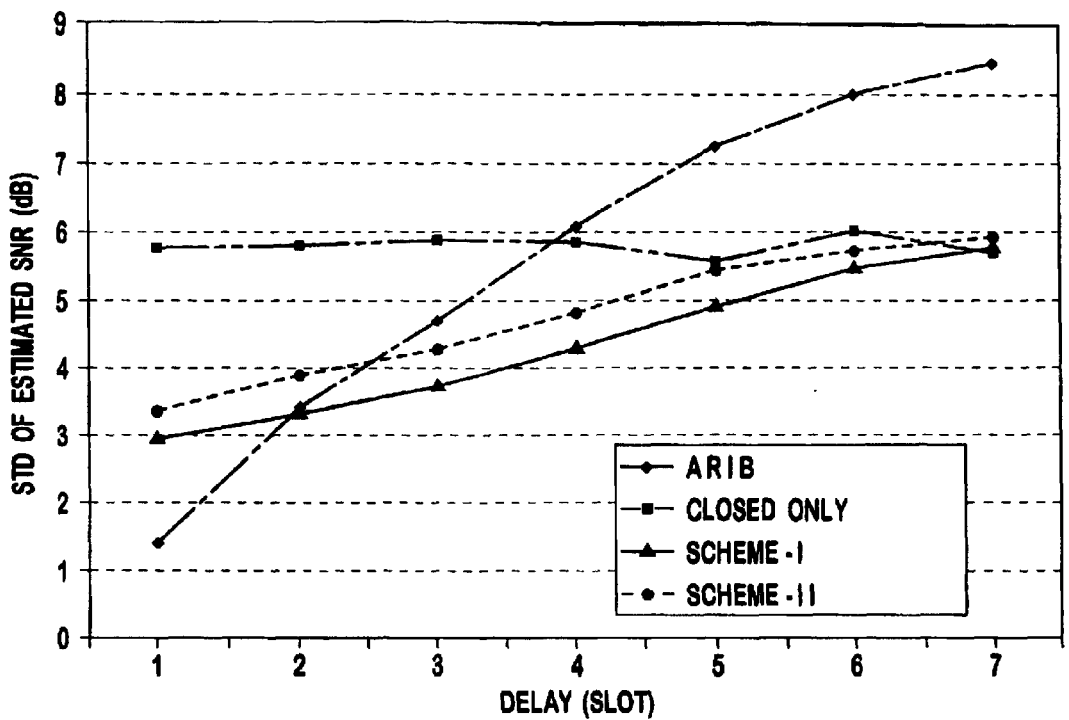
Figure 8:
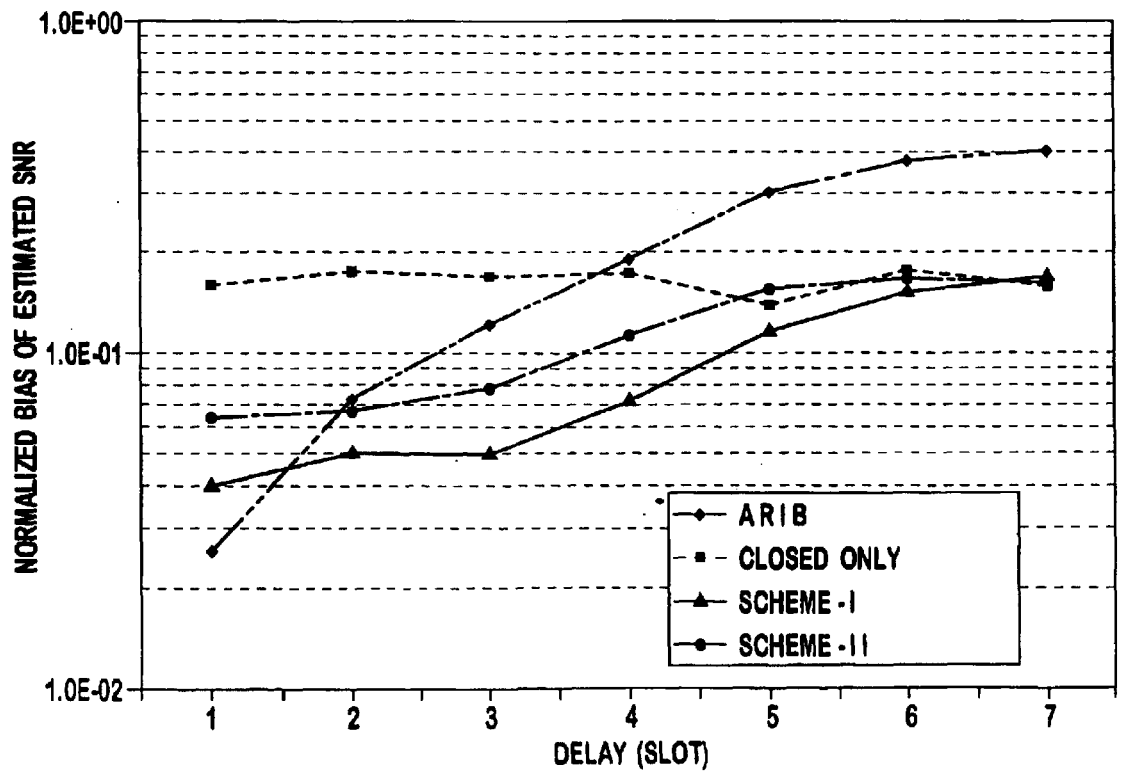

The preferred embodiments will be described with reference to the drawing figures where like numerals represent like elements throughout. Combined closed loop/open loop power control will be explained using the flow chart of FIG. 3 and the components of two simplified communication stations 50, 52 as shown in FIG. 4. For the following discussion, the communication station having its transmitter's power controlled is referred to as the transmitting station 52 and the communication station receiving power controlled communications is referred to as the receiving station 50. Since combined closed loop/open loop power control may be used for uplink, downlink or both types of communications, the transmitter having its power controlled may be located at a base station $30_1$, UE $32_1$ or both. Accordingly, if both uplink and downlink power control are used, the receiving and transmitting station's components are located at both the base station $30_1$ and UE $32_1$.

The receiving station 50 receives various radio frequency signals including communications from the transmitting station 52 using an antenna 56, or alternately, an antenna array. The received signals are passed through an isolator 60 to a demodulator 68 to produce a baseband signal. The baseband signal is processed, such as by a channel estimation device 96 and a data estimation device 98, in the time slots and with the appropriate codes assigned to the transmitting station's communication. The channel estimation device 96 commonly uses the training sequence component in the baseband signal to provide channel information, such as channel impulse responses. The channel information is used by the data estimation device 98, the interference measurement device 90, the signal power measurement device 92 and the transmit power calculation device 94. The data estimation device 98 recovers data from the channel by estimating soft symbols using the channel information. Using the soft symbols and channel information, the transmit power calculation device 94 controls the receiving station's transmission power level by controlling the gain of an amplifier 76.

The signal power measurement device 92 uses either the soft symbols or the channel information, or both, to determine the received signal power of the communication in decibels (dB). The interference measurement device 90 determines the interference level in dB, $I_{RS}$, within the channel, based on either the channel information, or the soft symbols generated by the data estimation device 98, or both.

The closed loop power command generator 88 uses the measured communication's received power level and the interference level, $I_{RS}$, to determine the Signal to Interference Ratio (SIR) of the received communication. Based on a comparison of the determined SIR with a target SIR ($SIR_{TARGET}$), a closed loop power command is generated, $b_{TPC}$, such as a power command bit, $b_{TPC}$, step 38. Alternately, the power command may be based on any quality measurement of the received signal.

For use in estimating the path loss between the receiving and transmitting stations 50, 52 and sending data, the receiving station 50 sends a communication to the transmitting station 58, step 40. The communication may be sent on any one of various channels. Typically, in a TDD system, the channels used for estimating path loss are referred to as reference channels, although other channels may be used. If the receiving station 50 is a base station $30_1$, the communication is preferably sent over a downlink common channel or a common control physical channel (CCPCH). Data to be communicated to the transmitting station 52 over the reference channel is referred to as reference channel data. The reference data may include, as shown, the interference level, $I_{RS}$, multiplexed with other reference data, such as the transmission power level of the reference channel, $T_{RS}$. The interference level, $I_{RS}$, and reference channel power level, $T_{RS}$, may be sent in other channels, such as a signaling channel. The closed loop power control command, $b_{TPC}$, is typically sent in a dedicated channel. The dedicated channel is dedicated to the communication between the receiving station 50 and transmitting station 52, step 40.

The reference channel data is generated by a reference channel data generator 86. The reference data is assigned one or multiple resource units based on the communication's bandwidth requirements. A spreading and training sequence insertion device 82 spreads the reference channel data and makes the spread reference data time-multiplexed with a training sequence in the appropriate time slots and codes of the assigned resource units. The resulting sequence is referred to as a communication burst. The communication burst is subsequently amplified by an amplifier 78. The amplified communication burst may be summed by a sum device 72 with any other communication burst created through devices, such as a data generator 84, spreading and training sequence insertion device 80 and amplifier 76.

The summed communication bursts are modulated by a modulator 64. The modulated signal is passed through an isolator 60 and radiated by an antenna 56 as shown or, alternately, through an antenna array. The radiated signal is passed through a wireless radio channel 54 to an antenna 58 of the transmitting station 52. The type of modulation used for the transmitted communication can be any of the those known to those skilled in the art, such as direct phase shift keying (DPSK) or quadrature phase shift keying (QPSK).

The antenna 58 or, alternately, antenna array of the transmitting station 52 receives various radio frequency signals. The received signals are passed through an isolator 62 to a demodulator 66 to produce a baseband signal. The baseband signal is processed, such as by a channel estimation device 100 and a data estimation device 102, in the time slots and with the appropriate codes assigned to the communication burst of the receiving station 50. The channel estimation device 100 commonly uses the training sequence component in the baseband signal to provide channel information, such as channel impulse responses. The channel information is used by the data estimation device 102, a power measurement device 110 and a quality measurement device 114.

The power level of the processed communication corresponding to the reference channel, $R_{TS}$, is measured by the power measurement device 110 and sent to a pathloss estimation device 112, step 42. Both the channel estimation device 100 and the data estimation device 102 are capable of separating the reference channel from all other channels. If an automatic gain control device or amplifier is used for processing the received signals, the measured power level is adjusted to correct for the gain of these devices at either the power measurement device 110 or the pathloss estimation device 112. The power measurement device 110 is a component of the combined closed loop/open loop controller 108. As illustrated in FIG. 4, the combined closed loop/open loop power controller 108 comprises the power measurement device 110, pathloss estimation device 112, quality measurement device 114, and transmit power calculation device 116.

To determine the path loss, L, the transmitting station 52 also requires the communication's transmitted power level, $T_{RS}$. The transmitted power level, $T_{RS}$, may be sent along with the communication's data or in a signaling channel. If the power level, $T_{RS}$, is sent along with the communication's data, the data estimation device 102 interprets the power level and sends the interpreted power level to the pathloss estimation device 112. If the receiving station 50 is a base station $30_1$, preferably the transmitted power level, $T_{RS}$, is sent via the broadcast channel (BCH) from the base station $30_1$. By subtracting the received communication's power level, $R_{TS}$ in dB, from the sent communication's transmitted power level, $T_{RS}$ in dB, the pathloss estimation device 112 estimates the path loss, L, between the two stations 50, 52, step 44. In certain situations, instead of transmitting the transmitted power level, $T_{RS}$, the receiving station 50 may transmit a reference for the transmitted power level. In that case, the pathloss estimation device 112 provides reference levels for the path loss, L.

If a time delay exists between the estimated path loss and the transmitted communication, the path loss experienced by the transmitted communication may differ from the calculated loss. In TDD systems where communications are sent in differing time slots $36_1$–$36_n$, the time slot delay between received and transmitted communications may degrade the performance of an open loop power control system. Combined closed loop/open loop power control utilizes both closed loop and open loop power control aspects. If the quality of the path loss measurement is high, the system primarily acts as an open loop system. If the quality of the path loss measurement is low, the system primarily acts as a closed loop system. To combine the two power control aspects, the system weights the open loop aspect based on the quality of the path loss measurement.

A quality measurement device 114 in a weighted open loop power controller 108 determines the quality of the estimated path loss, step 46. The quality may be determined using the channel information generated by the channel estimation device 100, the soft symbols generated by the data estimation device 102 or other quality measurement techniques. The estimated path loss quality is used to weight the path loss estimate by the transmit power calculation device 116. If the power command, $b_{TPC}$, was sent in the communication's data, the data estimation device 102 interprets the closed loop power command, $b_{TPC}$. Using the closed loop power command, $b_{TPC}$, and the weighted path loss, the transmit power calculation device 116 sets the transmit power level of the receiving station 50, step 48.

The following is one of the preferred combined closed loop/open loop power control algorithms. The transmitting station's power level in decibels, $P_{TS}$, is determined using Equations 4 and 6.

$$P_{TS}=P_0+G(n)+\alpha L \qquad \text{Equation 4}$$

$P_0$ is the power level that the receiving station 50 desires to receive the transmitting station's communication in dB. $P_0$ is determined by the desired SIR at the receiving station 50, $SIR_{TARGET}$, and the interference level, $I_{RS}$, at the receiving station 50 using Equation 5.

$$P_0=SIR_{TARGET}+I_{RS} \qquad \text{Equation 5}$$

$I_{RS}$ is either signaled or broadcasted from the receiving station 50 to the transmitting station 52. For downlink power control, $SIR_{TARGET}$ is known at the transmitting station 52. For uplink power control, $SIR_{TARGET}$ is signaled from the receiving station 50 to the transmitting station 52. G(n) is the closed loop power control factor. Equation 6 is one equation for determining G(n).

$$G(n)=G(n-1)+b_{TPC}\Delta_{TPC} \qquad \text{Equation 6}$$

G(n-1) is the previous closed loop power control factor. The power command, $b_{TPC}$, for use in Equation 6 is either +1 or −1. One technique for determining the power command, $b_{TPC}$, is Equation 3. The power command, $b_{TPC}$, is typically updated at a rate of 100 ms in a TDD system, although other update rates may be used. $\Delta_{TPC}$ is the change in power level. The change in power level is typically 1 dB although other values may be used. As a result, the closed loop factor increases by 1 dB if $b_{TPC}$ is +1 and decreases by 1 dB if $b_{TPC}$ is −1.

The weighting value, $\alpha$, is determined by the quality measurement device 114. $\alpha$ is a measure of the quality of the estimated path loss and is, preferably, based on the number of time slots, D, between the time slot of the last path loss estimate and the first time slot of the communication transmitted by the transmitting station 52. The value of $\alpha$ is from zero to one. Generally, if the time difference, D, between the time slots is small, the recent path loss estimate will be fairly accurate and $\alpha$ is set at a value close to one. By contrast, if the time difference is large, the path loss estimate may not be accurate and the closed loop aspect is most likely more accurate. Accordingly, $\alpha$ is set at a value closer to zero.

Equations 7 and 8 are two equations for determining a, although others may be used.

$$\alpha=1-(D-1)/(D_{max}-1) \qquad \text{Equation 7}$$

$$\alpha=\max\{1-(D-1)/(D_{max-allowed}-1), 0\} \qquad \text{Equation 8}$$

$D_{max}$ is the maximum possible delay. A typical value for a frame having fifteen time slots is seven. If the delay is $D_{max}$, $\alpha$ is zero. $D_{max-allowed}$ is the maximum allowed time slot delay for using open loop power control. If the delay exceeds $D_{max-allowed}$, open loop power control is effectively turned off by setting $\alpha=0$. Using the calculated transmit power level, $P_{TS}$, determined by a transmit power calculation device 116, the combined closed loop/open loop power controller 108 sets the transmit power of the transmitted communication.

Data to be transmitted in a communication from the transmitting station 52 is produced by a data generator 106. The communication data is spread and time-multiplexed with a training sequence by the spreading and training sequence insertion device 104 in the appropriate time slots and codes of the assigned resource units producing a communication burst. The spread signal is amplified by the amplifier 74 and modulated by the modulator 70 to radio frequency.

The combined closed loop/open loop power controller 108 controls the gain of the amplifier 74 to achieve the determined transmit power level, $P_{TS}$, for the communication. The power controlled communication is passed through the isolator 62 and radiated by the antenna 58.

Equations 9 and 10 are another preferred combined closed loop/open loop power control algorithm.

$$P_{TS}=P_0+K(n) \qquad \text{Equation 9}$$

$$K(n)=K(n-1)+b_{TPC}\Delta_{TPC}+\alpha L \qquad \text{Equation 10}$$

K(n) is the combined closed loop/open loop factor. As shown, this factor includes both the closed loop and open loop power control aspects. Equations 4 and 5 segregate the two aspects.

Although the two above algorithms only weighted the open loop factor, the weighting may be applied to the closed loop factor or both the open and closed loop factors. Under certain conditions, the network operator may desire to use solely open loop or solely closed loop power control. For example, the operator may use solely closed loop power control by setting a to zero.

FIGS. 5–10 depict graphs 118–128 illustrating the performance of a combined closed-loop/open-loop power control system. These graphs 118–128 depict the results of simulations comparing the performance of the ARIB proposed system, a closed loop, a combined open loop/closed loop system using Equations 4 and 6 (scheme I) and a combined system using Equations 9 and 10 (scheme II). The simulations were performed at the symbol rate. A spreading factor of sixteen was used for both the uplink and downlink channels. The uplink and downlink channels are International Telecommunication Union (ITU) Channel model [ITU-R M.1225, vehicular, type B]. Additive noises were simulated as being independent of white Gaussian noises with unity variance. The path loss is estimated at the transmitting station 52 which is a UE 32$_1$ and in particular a mobile station. The BCH channel was used for the path loss estimate. The path loss was estimated two times per frame at a rate of 200 cycles per second. The receiving station 50, which was a base station 30$_1$, sent the BCH transmission power level over the BCH. RAKE combining was used for both the UE 32$_1$ and base station 30$_1$. Antenna diversity combining was used at the base station 30$_1$.

Graphs 118, 122, 126 depict the standard deviation of the received signal to noise ratio (SNR) at the base station 30$_1$ of the UE's power controlled communication as a function of the time slot delay, D. Graphs 120, 124, 128 depict the normalized bias of the received SNR as a function of the delay, D. The normalization was performed with respect to the desired SNR. Each point in the graphs 118–128 represents the average of 3000 Monte-Carlo runs.

Graphs 118, 120 depict the results for an α set at one. For low time slot delays (D<4), scheme I and II outperform closed loop power control. For larger delays (D>4), closed loop outperforms both scheme I and II which demonstrates the importance of weighting the open loop and closed loop aspects.

Graphs 122, 124 depict the results for an α set at 0.5. As shown, for all delays excluding the maximum, schemes I and II outperform closed loop power control. The ARIB proposal only outperforms the others at the lowest delay (D=1).

Graphs 126, 128 depict the results for an a set using Equation 7 with $D_{max}$ equal to seven. As shown, schemes I and II outperform both closed loop and the ARIB proposal at all delays, D.

What is claimed is:

1. A spread spectrum time division duplex user equipment, the user equipment using frames with time slots for communication, receiving power commands and receiving a first communication having a transmission power level in a first time slot, measuring a power level of the first communication as received and determining a pathloss estimate based on in part the measured received first communication power level and the first communication transmission power level, the user equipment comprising:

means for setting a transmission power level for a second communication in a second time slot from the user equipment based on in part the pathloss estimate weighted by a quality factor and adjusted by the power commands.

2. The user equipment of claim 1 wherein the setting means sets the transmission power level based on in part a desired received power level, a closed loop factor and an open loop factor, the closed loop factor is based on in part the received power commands and the open loop factor is based on in part the pathloss estimate weighted by the quality factor.

3. The user equipment of claim 1 wherein the setting means sets the transmission power level based on in part a desired received power level at the first station and a combined closed loop/open loop factor, the combined closed loop/open loop factor is based on in part the received power commands and the path loss estimate weighted by the quality factor.

4. The user equipment of claim 2 wherein the closed loop factor is updated for each received power command.

5. The user equipment of claim 3 wherein the combined factor is updated for each received power command.

6. The user equipment of claim 2 wherein the desired received power level is based on in part a target signal to interference ratio and a measured interference level.

7. The user equipment of claim 3 wherein the desired received power level is based on in part a target signal to interference ratio and a measured interference level.

* * * * *

UNITED STATES PATENT AND TRADEMARK OFFICE
CERTIFICATE OF CORRECTION

PATENT NO. : 6,928,102 B2
DATED : August 9, 2005
INVENTOR(S) : Zeira et al.

It is certified that error appears in the above-identified patent and that said Letters Patent is hereby corrected as shown below:

Title page,
Item [56], References Cited, FOREIGN PATENT DOCUMENTS, delete
"WO          08/45962          10/1998", and insert
-- WO          98/45962          10/1998 --.
OTHER PUBLICATIONS,
delete "Zeira et al.," reference (all occurrences).

Column 1,
Line 23, after "stations", delete "301-307" and insert -- $30_1$-$30_7$ --.
Line 23, after "station", delete "301" and insert -- $30_1$ --.
Line 24, after "(UEs)", delete "321-323" and insert -- $32_1$-$32_3$ --.
Line 26, after "station", delete "301 to a UE 321" and insert -- $30_1$ to a UE $32_1$ --.
Line 28, delete "321 to a base station 301" and insert -- $32_1$ to a base station $30_1$ --.
Lines 36 and 38, after "slots", delete "361-36n" and insert -- $36_1$-$36_n$ --.
Line 40, after "slot", delete "361-36n" and insert -- $36_1$-$36_n$ --.
Line 47, after "UE", delete "321" and insert -- $32_1$ --.
Line 48, after "station", delete "301" and insert -- $30_1$ --.
Line 61, after "station", delete "301 transmits to a UE 321" and insert -- $30_1$ transmits to a UE $32_1$ --.
Line 63, after "UE", delete "321" and insert -- $32_1$ --.

Column 2,
Lines 2 and 7, after "station", delete "301" and insert -- $30_1$ --.
Lines 9 and 12, after "UE", delete "321" and insert -- $32_1$ --.
Line 11, delete "301" and insert -- $30_1$ --.
Line 11, after "command,", delete "bTPC" and insert -- $b_{TPC}$ --.
Line 43, delete "bTPC" and insert -- $b_{TPC}$ --.

Column 6,
Line 42, after "Accordingly,", delete "a" and insert -- $\alpha$ --.
Line 43, after "determining", delete "a" and insert -- $\alpha$ --.

Column 7,
Line 22, after "setting", delete "a" and insert -- $\alpha$ --.

UNITED STATES PATENT AND TRADEMARK OFFICE
CERTIFICATE OF CORRECTION

PATENT NO. : 6,928,102 B2
DATED : August 9, 2005
INVENTOR(S) : Zeira et al.

It is certified that error appears in the above-identified patent and that said Letters Patent is hereby corrected as shown below:

Column 8,
Line 1, after "delays", delete "(D>4)" and insert -- (D≥4) --.
Line 10, after "an", delete "a" and insert -- α --.

Signed and Sealed this

Seventh Day of February, 2006

JON W. DUDAS
*Director of the United States Patent and Trademark Office*